(12) United States Patent
Intihar

(10) Patent No.: US 6,300,964 B1
(45) Date of Patent: Oct. 9, 2001

(54) METHOD AND APPARATUS FOR STORAGE RETRIEVAL OF DIGITAL IMAGE DATA

(75) Inventor: Bruce Intihar, Toronto (CA)

(73) Assignee: Genesis Microship, Inc., Ontario (CA)

( * ) Notice: Subject to any disclaimer, the term of this patent is extended or adjusted under 35 U.S.C. 154(b) by 0 days.

(21) Appl. No.: 09/124,994

(22) Filed: Jul. 30, 1998

(51) Int. Cl.$^7$ .................................................. G06F 12/06
(52) U.S. Cl. ........................................... 345/574; 345/539
(58) Field of Search ...................... 345/507, 509, 345/511, 501, 521, 515, 523, 524, 530, 539, 572–574, 561, 563, 531; 348/97, 714–718, 443, 446, 448, 456

(56) References Cited

U.S. PATENT DOCUMENTS

| | | | |
|---|---|---|---|
| 4,288,818 | 9/1981 | Poetsch | 348/97 |
| 4,310,856 | 1/1982 | Poetsch | 348/97 |
| 4,346,408 | 8/1982 | Massmann | 348/97 |
| 4,399,465 | 8/1983 | Massmann | 348/97 |
| 4,479,146 | 10/1984 | Cohn | 348/180 |
| 4,633,293 | 12/1986 | Powers | 348/441 |
| 4,668,985 | * 5/1987 | Kurashige et al. | 348/721 |
| 4,719,509 | * 1/1988 | Sakamoto | 348/163 |
| 4,720,744 | 1/1988 | Washi et al. | 348/469 |
| 4,876,596 | 10/1989 | Faroudja | 348/450 |
| 4,987,551 | 1/1991 | Garrett, Jr. | 345/162 |
| 5,008,838 | 4/1991 | Kelleher et al. | 345/508 |
| 5,257,348 | 10/1993 | Roskowski et al. | 345/327 |
| 5,321,809 | 6/1994 | Aranda | 345/422 |
| 5,550,592 | 8/1996 | Markandey et al. | 348/448 |
| 5,572,691 | * 11/1996 | Koudmani | 345/508 X |
| 5,584,032 | * 12/1996 | Hyatt | 711/100 |
| 5,598,525 | 1/1997 | Nally | 345/520 |
| 5,604,514 | 2/1997 | Hancock | 345/154 |
| 5,629,723 | * 5/1997 | West et al. | 345/201 |
| 5,764,964 | * 6/1998 | Dwin et al. | 345/509 |
| 5,914,711 | * 6/1999 | Mangerson et al. | 345/203 |

OTHER PUBLICATIONS

IBM RGB526/RGB526DB manual, pp. 1–15, Sep. 25, 1995.*

* cited by examiner

*Primary Examiner*—Kee M. Tung
(74) *Attorney, Agent, or Firm*—Staas & Halsey, LLP

(57) ABSTRACT

A method of digital image storage utilizing a number of image storage memories, utilizing separate and independent write and read controls to the storage memories, utilizing write masking to selectively write to the storage memories, utilizing full or partial read from the storage memories to simultaneously access corresponding image data from multiple images, while permitting a non-integral number of image delays between input and output.

15 Claims, 16 Drawing Sheets

Contents of Field Delays when Image
Source is generating Input Image 3

Memory array with M addresses each with 2N bits per address location

W - write pointer
R - read pointer

W - write pointer
R - read pointer

METHOD AND APPARATUS FOR STORAGE RETRIEVAL OF DIGITAL IMAGE DATA

FIELD OF THE INVENTION

The present invention relates in general to digital image processing and more particularly to an apparatus and method for storing and retrieving digital image data in a memory for use in further processing.

BACKGROUND OF THE INVENTION

Electronic storage of digital image data prior to subsequent processing has been used for many years.

One prior art image storage method for use in systems which process multiple digital images involves using multiple image delays connected in series. Input data is fed into the first delay element, the output of the first delay element is fed into a second delay element, and so on. The outputs of all the delay elements along with the input data are then available for subsequent processing such as filtering.

Another prior art method for multiple image storage uses a large memory device (i.e. memory array) with enough storage locations (addresses) for two or more images. Image data is stored sequentially in the memory array, and retrieved at a later time for downstream processing. This method requires multiple read operations to retrieve all of the desired data from each of the individual images stored in the memory array. Multiple read operations require a very high speed and costly memory array and additional logic circuits to control the reading from multiple addresses.

As discussed above, prior art methods have been used in downstream image processing applications. One such application involves converting a series of film frames to video. To convert a 24 Hz film to 60 Hz interlaced video, the individual film frames are first scanned and separated into two video fields (A and B). Unlike live video, these two fields are not temporally displaced; fields A and B can be displayed in either order as they both contain material captured at the same time. Following this step, the film fields are displayed one after the other, alternating between A and B with an extra field inserted every four fields. This process is called 3:2 pulldown, so named for the number of video fields "pulled down" from each film frame (three fields from Frame 1, two fields from Frame 2, etc.). The resulting field rate becomes 60 Hz which can be easily transferred to videotape.

The prior art techniques discussed above do not allow for variations in the input data rate without affecting the output image processing rate. It is well understood that variations in data rates are common in video and graphics sources, especially if the original source is in an analog format (such as a VCR) or communicated over a bus. In addition, the prior art techniques result in a delay between input and output which is an integral number of image delays. In some cases it is desirable to have a non-integral or variable amount of delay between input and output, such as in temporal filtering between multiple images or in frame rate conversion, as discussed above. Furthermore, in some circumstances minimum latency from input to output may be required.

The following prior art is considered pertinent to the present disclosure:

| U.S. Patent Documents | | |
|---|---|---|
| 4,876,596 - Faroudja | Oct 24/89 | Film-to-video converter with scan line doubling |
| 4,987,551 - Garrett, Jr. | Jan 22/91 | Apparatus for creating a cursor pattern by strips related to individual scan lines |
| 5,008,838 - Kelleher, et al. | Apr 16/91 | Method for simultaneous initialization of a double buffer and a frame buffer |
| 5,257,348 - Roskowski, et al | Oct 26/93 | Apparatus for storing data both video and graphics signals in a single frame buffer |
| 5,321,809 - Aranda | Jun 14/94 | Categorized pixel variable buffering and processing for a graphics system |
| 5,550,592 - Markandey, et al. | Aug 27/96 | Film mode progressive scan conversion |
| 5,598,525 - Nally, et al. | Jan 28/97 | Apparatus, systems and methods for controlling graphics and video data in multimedia data processing and display systems |
| 5,604,514 - Hancock | Feb 18/97 | Personal computer with combined graphics/image display system having pixel mode frame buffer interpretation |

SUMMARY OF THE INVENTION

According to the present invention, a more flexible solution is provided to image processing than is provided in the prior art where the output image is a function of one or more input images, such as in video de-interlacing, frame rate conversion, temporal filtering and interpolation, and image motion analysis. A storage technique is provided for multi-image processing where it is desired to have a non-integral number of image delays between input and output, or where the amount of delay between input and output is required to be variable over time; and where the image data is not required to be transferred serially along the sequence of image delays.

According to another aspect of the present invention, an improvement is provided in digital image storage for downstream processing of a 3:2 pulldown sequence of video. The invention provides techniques for storing the images in such a way as to allow processing of images originating only from a specific film frame while storing incoming data from a different film frame for future processing. The aforementioned benefits of the present invention, namely a non-integral or variable amount of delay between input and output, also apply in the storage of a 3:2 pulldown sequence of video.

Therefore, in accordance with the present invention there is provided an image data storage and retrieval device using a memory array which is partitioned into at least two sections. A write pointer is used to generate addresses of the memory (including all sections of the memory) where image data is to be stored. A write mask generator is used to mask predetermined sections of the memory addressed by the pointer where it is desired to prevent overwriting of data. A read pointer generates addresses in the memory array from which data is to be retrieved for further processing.

The method of operation for storing the input data according to the present invention comprises in its most general aspect the steps of:
1) Generating a write pointer to indicate the location in the memory array where new input data is to be stored;
2) Generating a write mask which inhibits writing to sections of the memory array, so that stored data from other images is not overwritten;

3) Enabling the writing of the input data into the array.
4) Following completion of the input image data, the write pointer may be reset if old data is to be overwritten, or unmodified if new data is to be stored in a separate address space within the memory array.

Concurrently with the storage of input data, the method of operation for retrieving the output data comprises the steps of:
1) Generating a read pointer to indicate the location in the memory array where the desired image data to process is located;
2) Enabling the reading of the stored data from the array, with the ability to access all corresponding image data in all stored images simultaneously.
3) Following completion of the output image data, the read pointer is reset to the location where the next image data is stored. This may be the same location as the data previously read or a new location where newer data is stored.

In one more aspect of the present invention, the storage for image data is comprised of multiple memory arrays wherein writing to each individual array can be selectively controlled through use of array enable signals, in lieu of a write mask with a single memory array.

In a further aspect of the present invention, the storage for image data may be contained on the same device as the image processing circuits.

In a still further aspect of the present invention, the memory array utilizes a single bidirectional data bus for both writing data to the memory array and also reading data from the memory array. This aspect is shown in FIG. 8A.

In yet one more aspect of the present invention, the memory array utilizes a single unified address input to indicate both reading and writing locations along with an additional input indicating whether the address indicates a write location or a read location, and a unified address generator which supplies both write and read address locations.

In yet another aspect of the present invention, additional read operations from the memory array are performed during periods when the memory array is idle to allow additional image data analysis separate from the primary processing effort.

In a further aspect of the present invention, the apparatus is used to perform image processing with image material originating from both video and film sources and other sources such as computer graphics in applications such as temporal filtering or frame rate conversion.

These and other objects, aspects, advantages, and features of the present invention will be more fully understood and appreciated by consideration of the following detailed description of a preferred embodiment, presented in conjunction with the accompanying drawings.

BRIEF DESCRIPTION OF THE DRAWINGS

A description of the prior art and of the preferred embodiment of the present invention is provided hereinbelow with reference to the following drawings in which:

FIG. 8A is a block diagram showing an alternative embodiment of the present invention where the memory array utilizes a single bidirectional data bus for both writing and reading data; and.

DETAILED DESCRIPTION OF THE PREFERRED EMBODIMENT

Figure 1A:
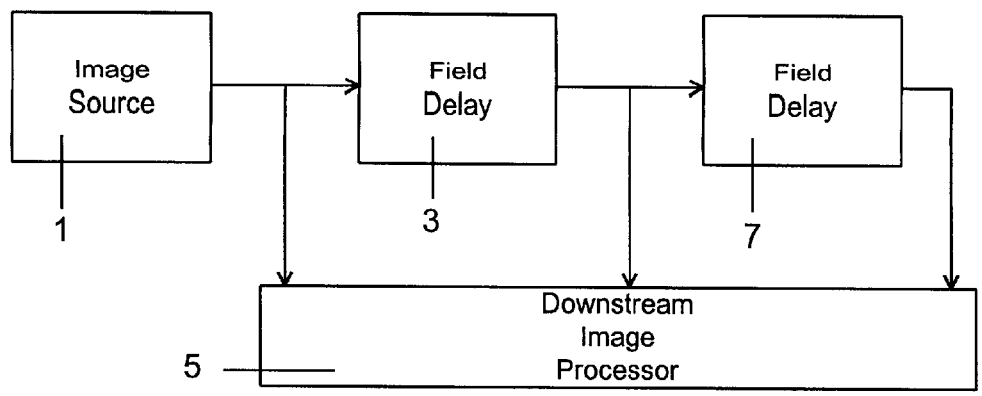
FIG. 1A is a block diagram showing a memory array for digital image storage using unit field delays according to the prior art.

FIG. 1A illustrates a conventional prior art approach to storing multiple digital images in multiple image delays. The input data is provided by an image source 1 and fed to a field delay 3 and to a first input of a downstream image processor 5. The delayed image data from field delay 3 is fed to the input of field delay 7 and to a second input of images processor 5, and so on.

Figure 1B:
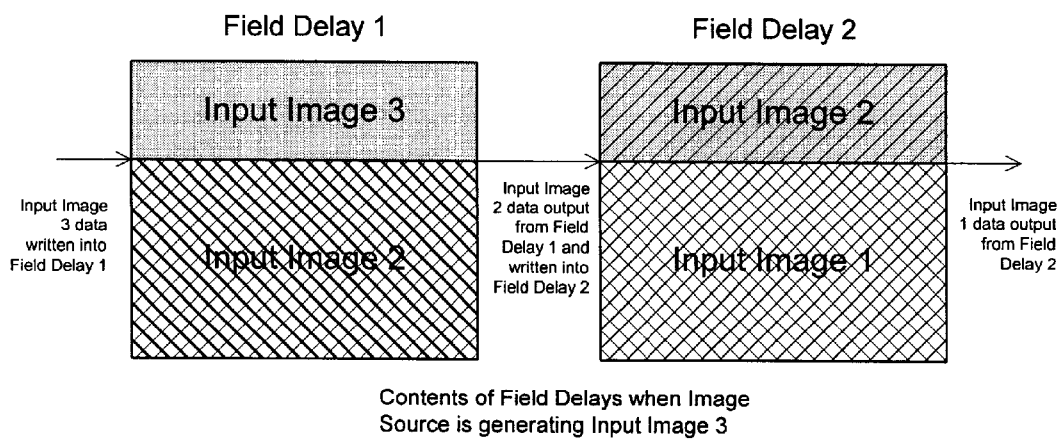
FIG. 1B shows a typical content of the field delays during multiple image processing according to the prior art system for FIG. 1A.

FIG. 1B schematically represents the transfer of images (input image 1, input image 2 and input image 3) through field delays 3 and 7.

Figure 1C:
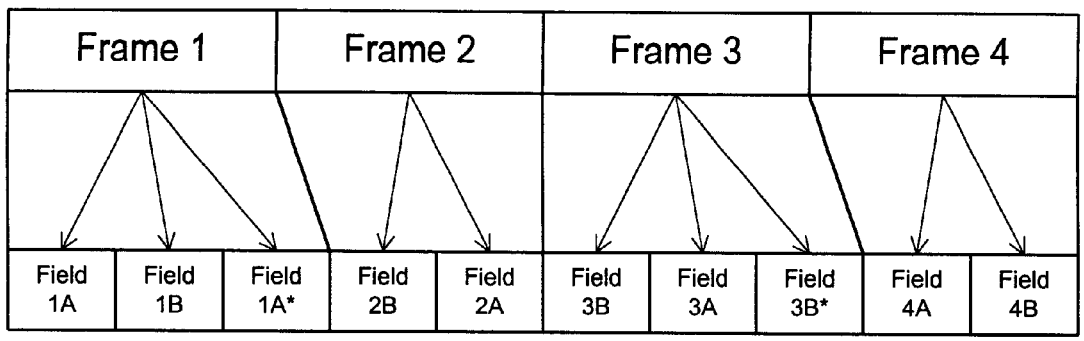
FIG. 1C shows a sequence of video fields originating from a film source using techniques according to the prior art.

FIG. 1C shows a sequence of video fields being converted from film frame rate to video rate, according to the prior art 3:2 pulldown technique. As shown in FIG. 1C, the fields of video which are created from film Frame 1 are labeled Field 1A, 1B, and 1A*. Field 1A contains all the even scan lines of the film Frame 1, and Field 1B contains all the odd scan lines of film Frame 1. The extra field Field 1A* is identical to Field 1A except possibly for a difference in the noise content.

Figure 2:
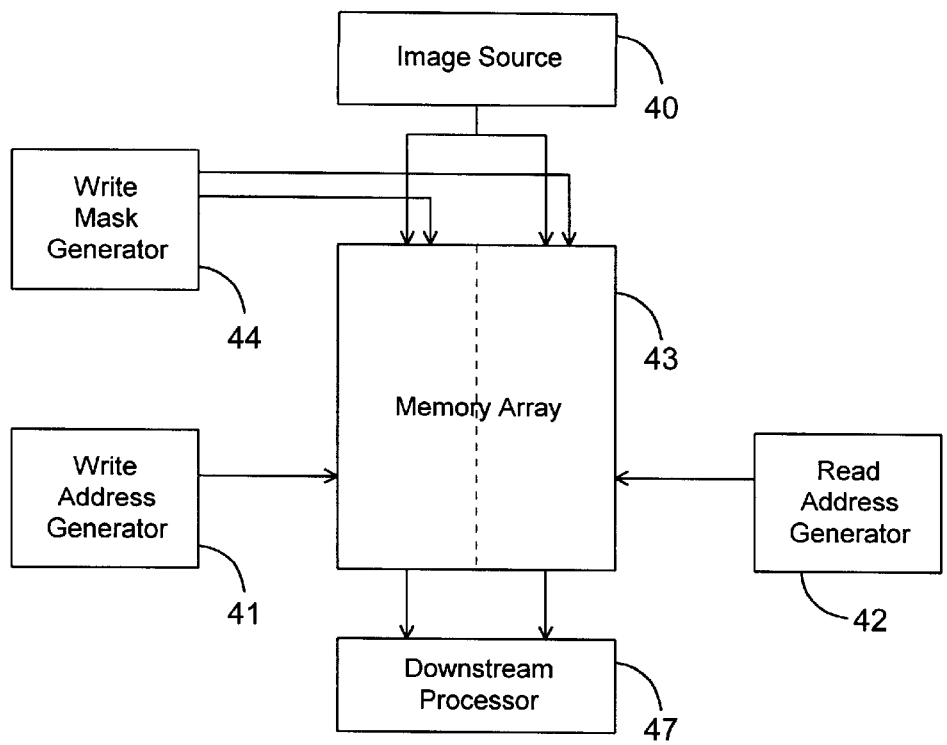
FIG. 2 is a block diagram showing a memory array and supporting control circuits for digital image storage, according to the preferred embodiment of the invention.

FIG. 2 illustrates a block diagram according to the preferred embodiment, comprising digital image source 40, write address generator 41, read address generator 42, memory array 43, write mask generator 44, and downstream digital image processor 47.

Figure 3:
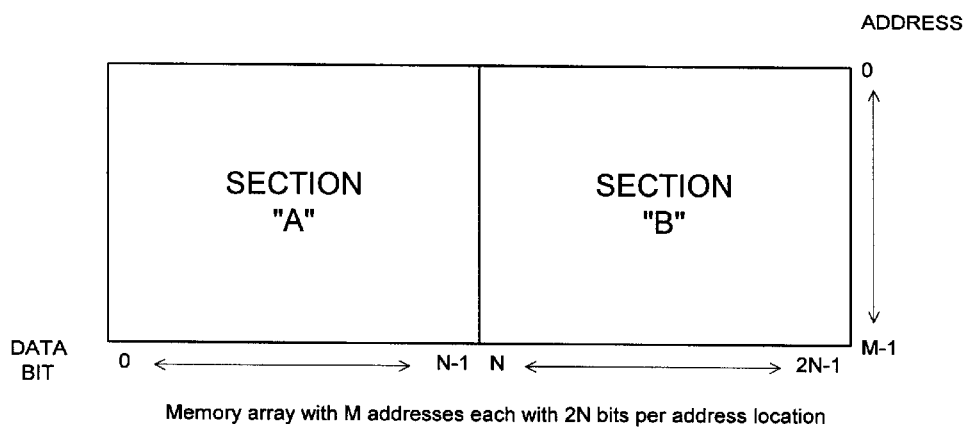
FIG. 3 is a schematic representation of the memory array of FIG. 2, according to the preferred embodiment.

FIG. 3 illustrates the structure and organization of the memory array 43 with M address locations labeled 0 to M−1, and with 2N bits of storage per address location divided into two sections A and B represented by bits 0 to N−1 and by bits N to 2N−1 respectively, according to the preferred embodiment.

The digital image source 40 provides digital image data to both sections of the memory array 43. The Write Mask Generator 44 provides masking signals to the memory array 43 to control writing of data into the array. The Write Address Generator 41 and Read Address Generator 42 provide memory array address locations where data is written to and read from, respectively. The memory array 43 output data stream is connected to a downstream processor 47 for image processing and manipulation.

Figure 4:
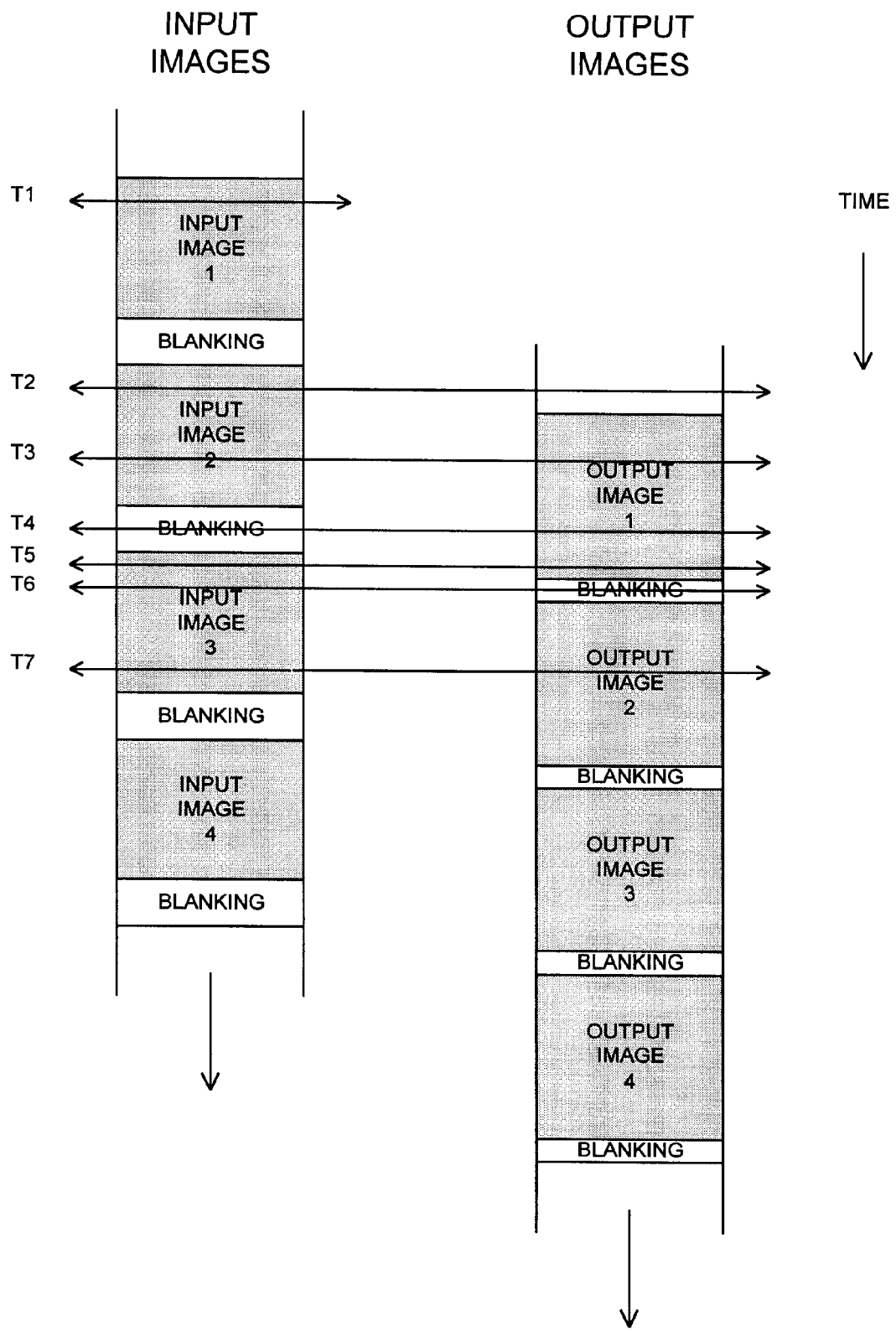
FIG. 4 shows the relationship between input data and output data, according to a first mode of operation of the preferred embodiment.

In one mode of operation of the preferred embodiment, digital image data is transmitted by source device 40 as illustrated in FIG. 4. The input sequence comprises a number of digital images separated by an amount of blanking time in which no image data is transmitted.

Figure 5A:
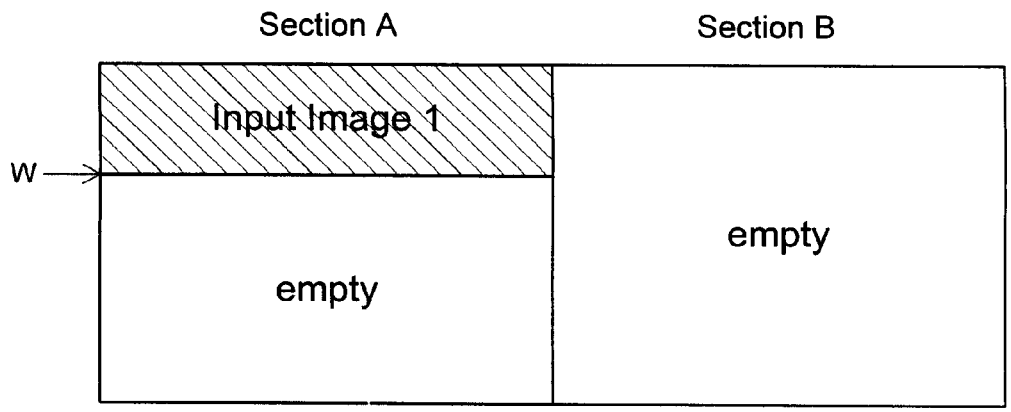
FIG. 5A shows the contents of the memory array at a time interval T1 as identified in FIG. 4, according to the first mode of operation of the preferred embodiment.

The Write Address Generator 41 and Read Address Generator 42 are initialized to a start address. The first input image (Input Image 1) is written into section A of the memory array 43, starting at the address indicated by Write Address Generator 41. The Write Mask Generator 44 controls the array so that no writing of data occurs to memory array section B. No valid processing can be done since memory array section B is empty, so there is no read operation. This is shown as time T1 in FIG. 4 with memory array contents as shown in FIG. 5A.

Figure 5B:
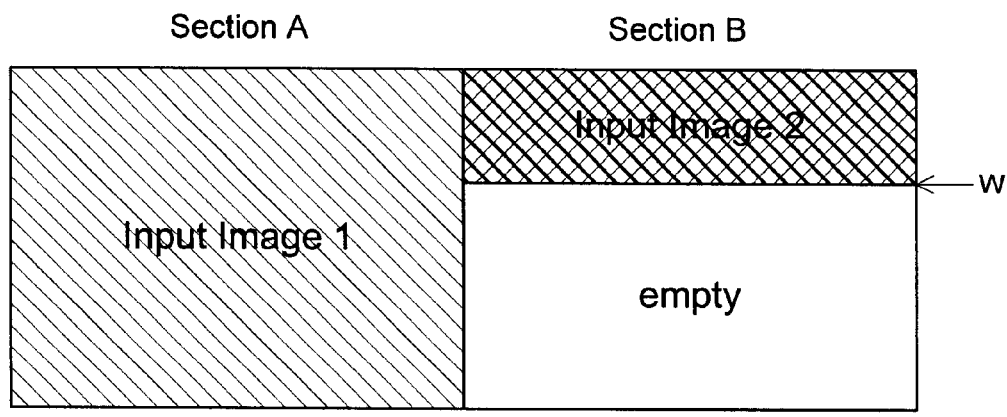
FIG. 5B shows the contents of the memory array at a time interval T2 as identified in FIG. 4, according to the first mode of operation of the preferred embodiment.

At the start of Input Image 2, the Write Address Generator 41 is reset to the initial address. As Input Image 2 data arrives from data source 40 it is written to memory array section B, starting at the address indicated by Write Address Generator 41. The Write Mask Generator 44 controls the array so that no writing of data occurs to memory array section A, and the data in memory array section A is unaffected by this second write to the same addresses. This is shown as time T2 in FIG. 4 with memory array contents as shown in FIG. 5B.

Figure 5C:
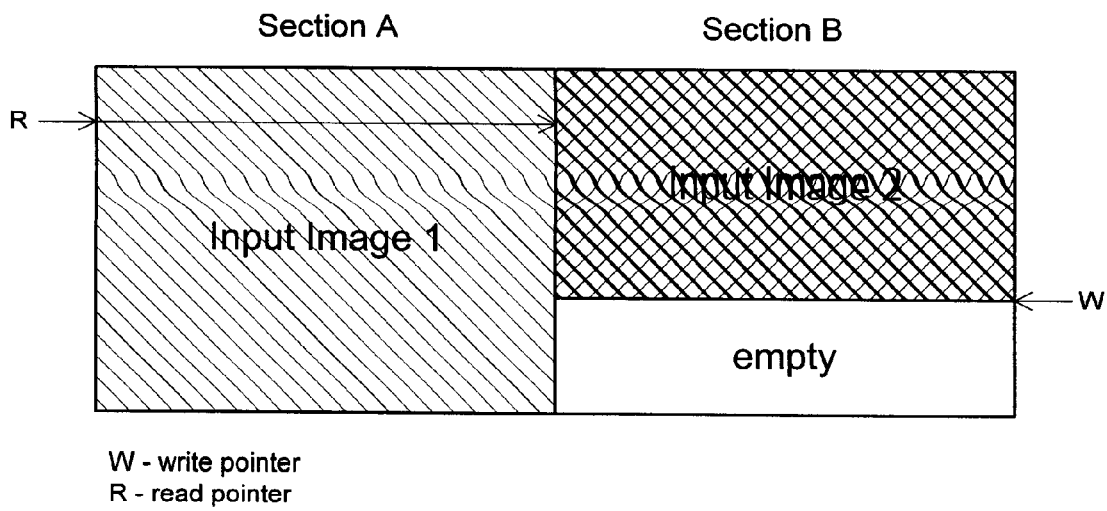
FIG. 5C shows the contents of the memory array at a time interval T3 as identified in FIG. 4, according to the first mode of operation of the preferred embodiment.

Shortly after time 2, the stored data (Input Images 1 and 2) is read out of the memory array, starting at the initial address indicated by Read Address Generator 42. Since some data from Input Image 2 has already been written, it is now available along with Input Image 1 data for downstream processing by processor 47. A read from the initial addresses fetches the first lines of both Input Images 1 and 2. Subsequent reads to subsequent addresses as indicated by Read Address Generator 42 fetch complementary lines from both images. Since writing is always ahead of reading, there is no risk of memory array underflow such as a read from memory before the data has been written there. This read operation is shown as time 3 in FIG. 4 with memory contents as shown in FIG. 5C.

Figure 5D:
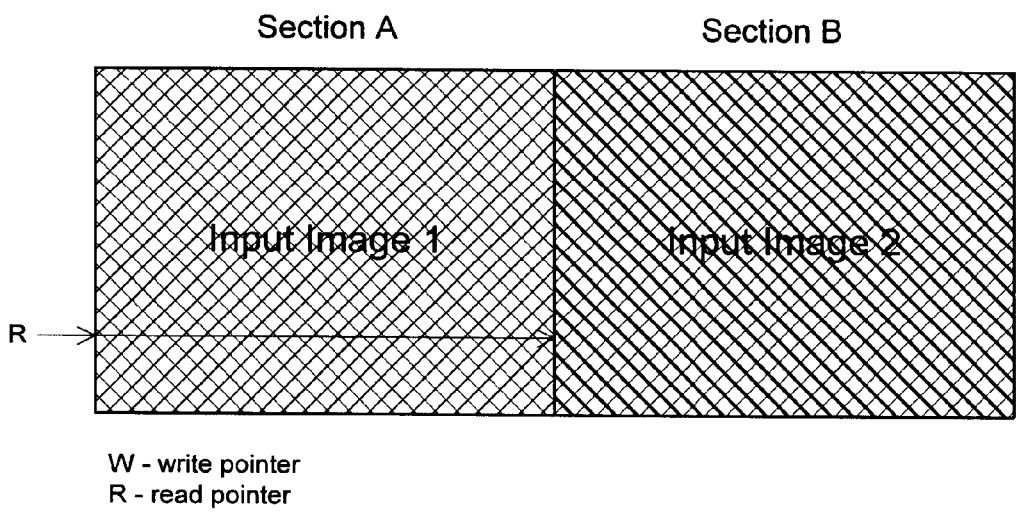
FIG. 5D shows the contents of the memory array at a time interval T4 as identified in FIG. 4, according to the first mode of operation of the preferred embodiment.

After Input Image 2 has been written completely, the input source 40 is now in blanking and no further data is supplied. However, reading of data may still be ongoing as output data is processed by processor 47. This read operation is shown as time T4 in FIG. 4 with memory contents as shown in FIG. 5D.

Figure 5E:
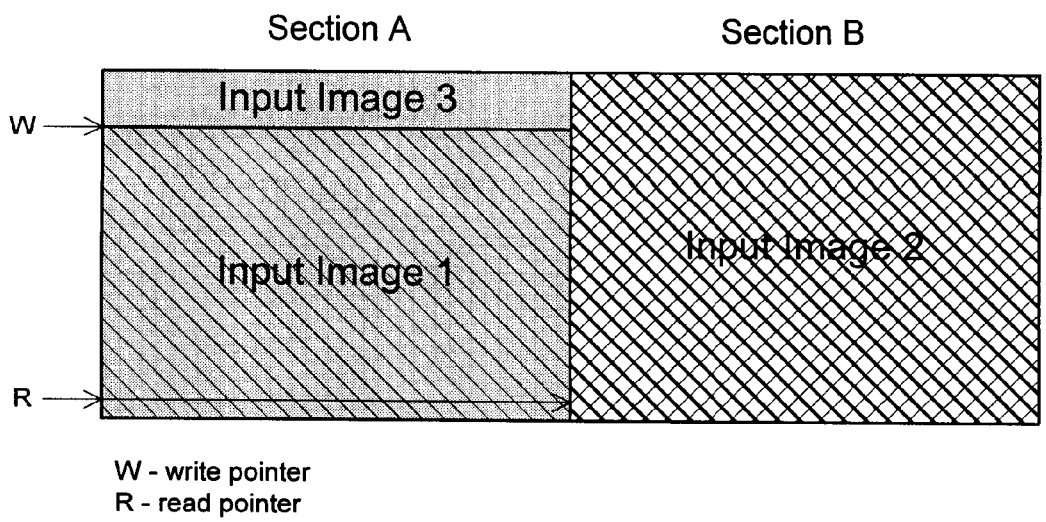
FIG. 5E shows the contents ol the memory array at a time interval T5 as identified in FIG. 4, according to the first mode of operation of the preferred embodiment.

At the start of Input Image 3, the Write Address Generator 41 is reset to the initial address. The Write Mask Generator 44 controls the array so that no writing of data occurs to memory array section B. As Input Image 3 image data arrives from data source 40 it is written to memory array section A. By this time, output processing has finished using the first lines of Input Image 1 and they are no longer needed. Section B contains Input Image 2 information which is protected from overwrite by the Write Mask. This event is shown as time T5 in FIG. 4 with memory contents as shown in FIG. 5E.

Figure 5F:
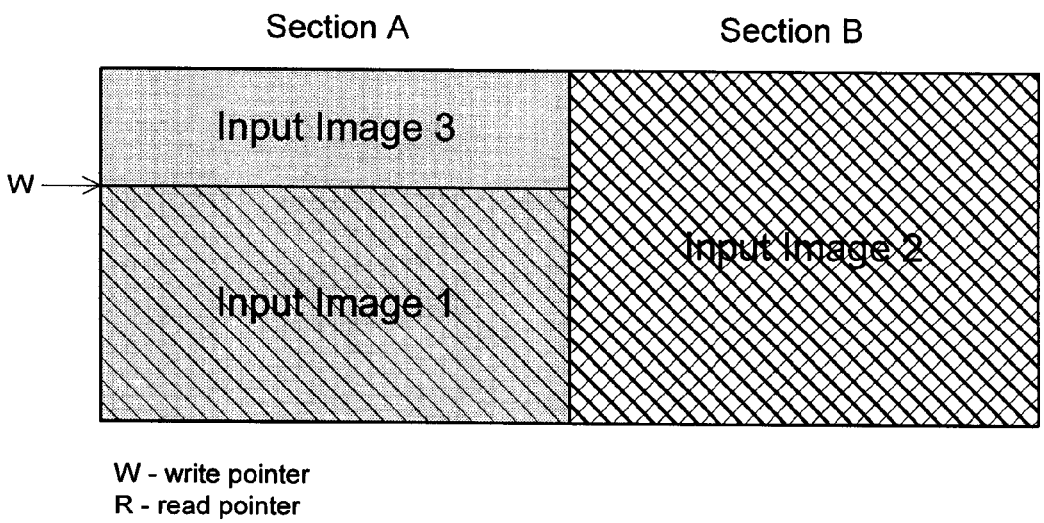
FIG. 5F shows the contents of the memory array at a time interval T6 as identified in FIG. 4, according to the first mode of operation of the preferred embodiment.
Figure 5G:
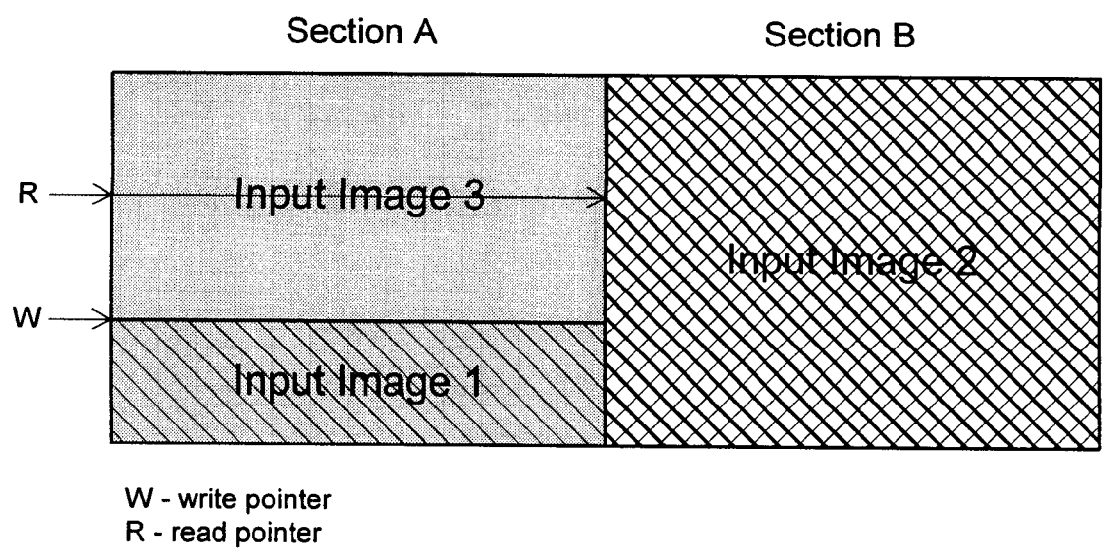
FIG. 5G shows the contents of the memory array at a time interval T7 as identified in FIG. 4, according to the first mode of operation of the preferred embodiment.

At some time T after time T5, output processing using data from Input Images 1 and 2 has completed and no further read operations take place. However, writing of Input Image 3 input data into memory array section A continues. This event is shown as time T6 in FIG. 4 with memory contents as shown in FIG. 5F. At some time after time T6, the Read Address Generator 42 is reset to the initial address and the stored data (Input Images 2 and 3) is read out of the memory array 43. In a similar manner as described for time T3, a read operation from the initial address fetches the first lines of both Input Images 2 and 3. Subsequent read operations fetch the remaining data. Write operations of Input Image 3 data continue to addresses indicated by the Write Address Generator 41. This event is shown as time T7 in FIG. 4 with memory contents as shown in FIG. 5G.

The cycle continues with each subsequent incoming image being stored alternately in memory section A or B by controlling the Write Mask Generator 44. Read operations retrieve the stored data from both sections of memory array 43.

Figure 6:
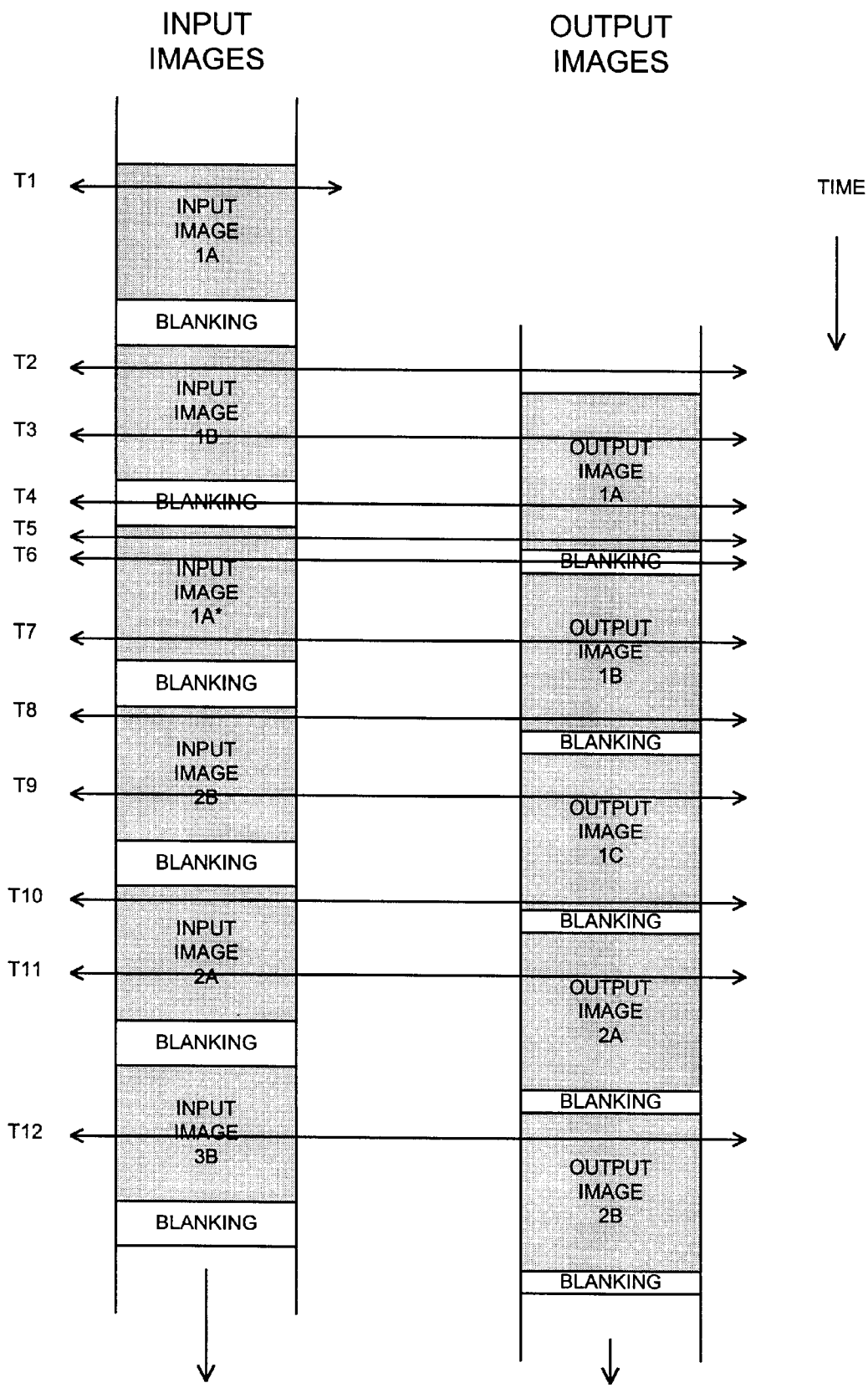
FIG. 6 shows the relationship between the input data and the output data, according to a second mode of operation of the preferred embodiment.

In a second mode of operation of the preferred embodiment, digital image data is transmitted by source device 40 as illustrated in FIG. 6. The input sequence comprises a number of digital images separated by an amount of blanking time Tin which no image data is transmitted as discussed above in connection with the first mode of operation. However, in this mode the series of images have been captured from film such that each film frame is successively transferred into either three or two video image fields in an alternating pattern as discussed above in connection with the prior art illustrated in FIG. 1C.

Figure 7A:
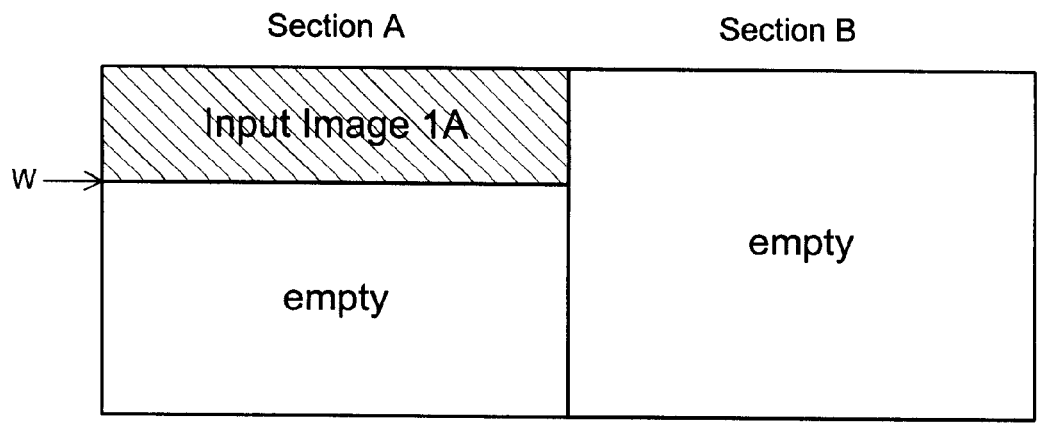
FIG. 7A shows the contents of the memory array at a time interval T1 as identified in FIG. 6, according to the second mode of operation of the preferred embodiment.

The Write Address Generator 41 and Read Address Generator 42 are initialized to a start address. The first input image (Input Image 1A) is written into section A of the memory array 43, starting at the address indicated by Write Address Generator 41. The Write Mask Generator 44 controls the array so that no writing of data occurs to memory array section B. No valid processing can be done since memory array section B is empty, so there is no read operation. This is shown as time T1 in FIG. 6 with memory array contents as shown in FIG. 7A.

Figure 7B:
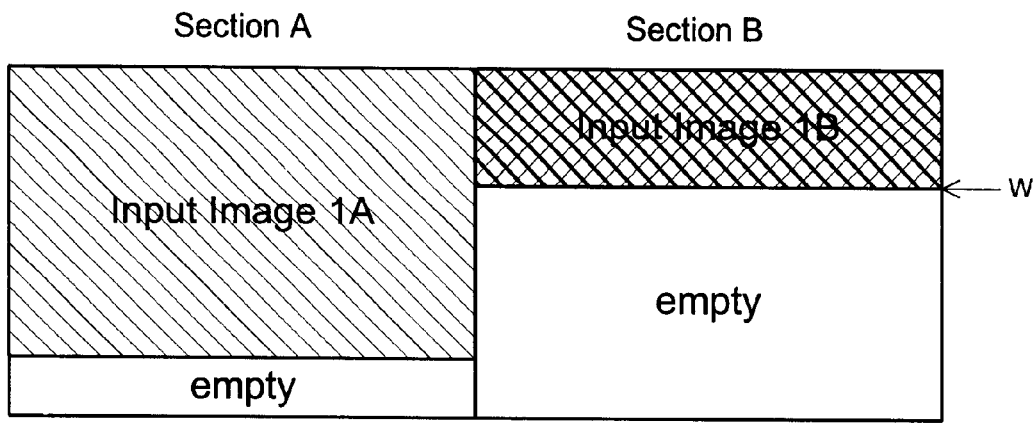
FIG. 7B shows the contents of the memory array at a time interval T2 as identified in FIG. 6, according to the second mode of operation of the preferred embodiment.

At the start of Input Image 1B, the Write Address Generator 41 is reset to the initial address. As Input Image 1B data arrives from data source 40 it is written to memory array section B, starting at the address indicated by Write Address Generator 41. The Write Mask Generator 44 controls the array so that no writing of data occurs to memory array section A, and the data in memory array section A is unaffected by this second write to the addresses. This is shown as time T2 in FIG. 6 with memory array contents as shown in FIG. 7B.

At some future time shortly after time T2, the stored data (Input Images 1A and 1B) is read out of the memory array 43, starting at the initial address indicated by Read Address Generator 42. Since some data from Input Image 1B has already been written, it is now available along with Input Image 1A data for downstream processing by processor 47. A read from the initial addresses fetches the first lines of both Input Images 1A and 1B. Subsequent reads to subsequent addresses as indicated by Read Address Generator 42 fetch complementary lines from both images. Since writing is always ahead of reading, here is no risk of memory array underflow such as a read from memory before the data has been written there.

Figure 7C:
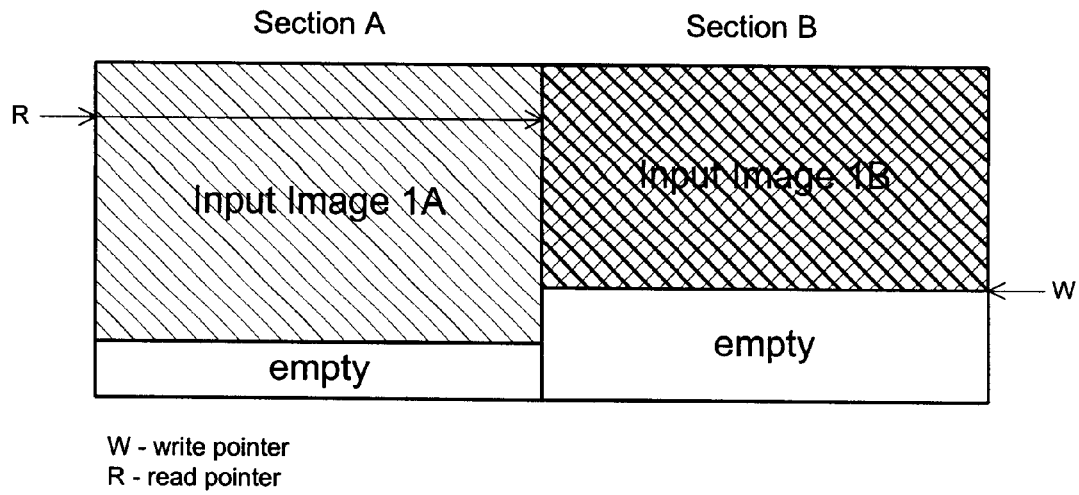
FIG. 7C shows the contents of the memory array at a time interval T3 as identified in FIG. 6, according to the second mode of operation of the preferred embodiment.
Figure 7D:
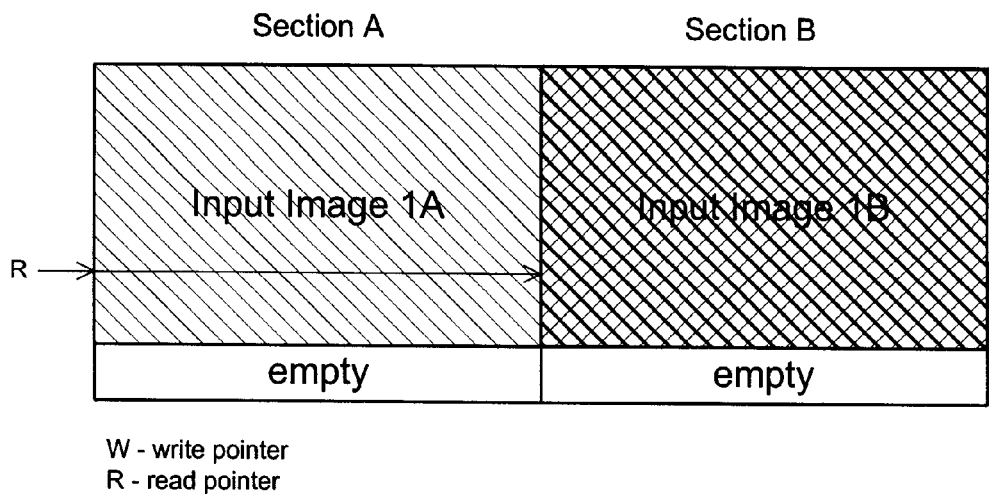
FIG. 7D shows the contents of the memory array at a time interval T4 as identified in FIG. 6, according to the second mode of operation of the preferred embodiment.

This read operation is shown as time T3 in FIG. 6 with memory contents as shown in FIG. 7C. After Input Image IB has been written completely, the input source 40 is now in blanking and no further data is supplied. However, reading of data may still be ongoing as output data is processed by processor 47. This read operation is shown as time T4 in FIG. 6 with memory contents as shown in FIG. 7D.

Figure 7E:
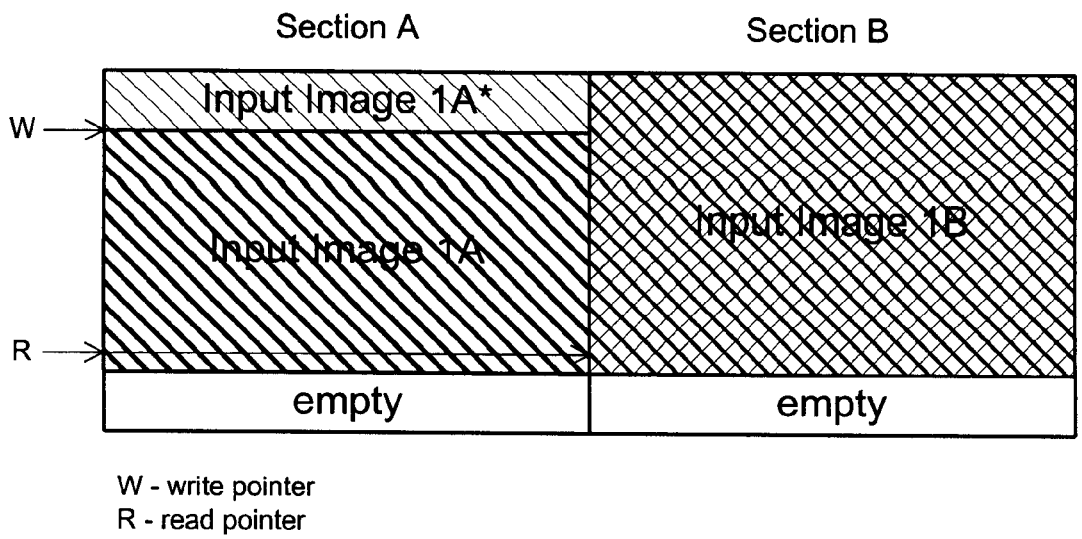
FIG. 7E shows the contents of the memory array at a time interval T5 as identified in FIG. 6, according to the second mode of operation of the preferred embodiment.

At the start of Input Image 1A*, the Write Address Generator 41 is reset to the initial address. Input Image 1A* contains the same data as Input Image 1A (except for a small amount of system noise) because both Input Images 1A and 1A* originate from the same film material. For this reason, Input Image 1A is overwritten by Input Image 1A*. In a variation to this embodiment, Input Image 1A* may be discarded in favour of the previously stored Input Image 1A. The Write Mask Generator 44 controls the array so that no writing of data occurs to memory array section B. As Input Image 1A* image data arrives from data source 40 it is written to memory array section A. By this time, output processing has finished using the first lines of Input Image 1A and they are no longer needed. Section B contains Input Image 1B information which is protected from overwrite by the Write Mask. This event is shown as time T5 in FIG. 6 with memory contents as shown in FIG. 7E.

Figure 7F:
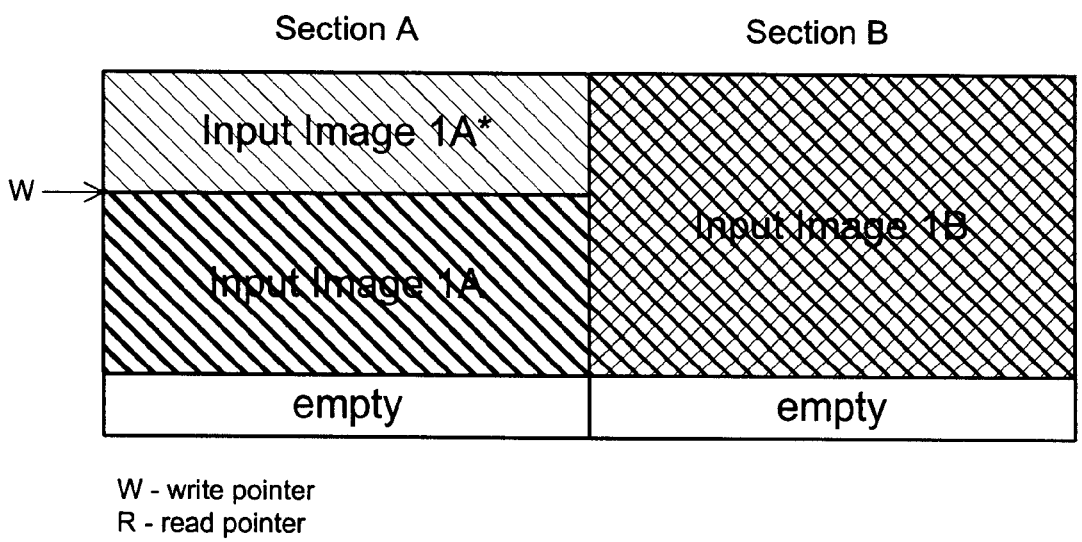
FIG. 7F shows the contents of the memory array at a time interval T6 as identified in FIG. 6, according to the second mode of operation of the preferred embodiment.

At some time T after time T5, output processing using data from Input Images 1A and 1B has completed and no further read operations take place. However, writing of Input Image 1A* input data into memory array section A continues. This event is shown as time T6 in FIG. 6 with memory contents as shown in FIG. 7F.

Figure 7G:
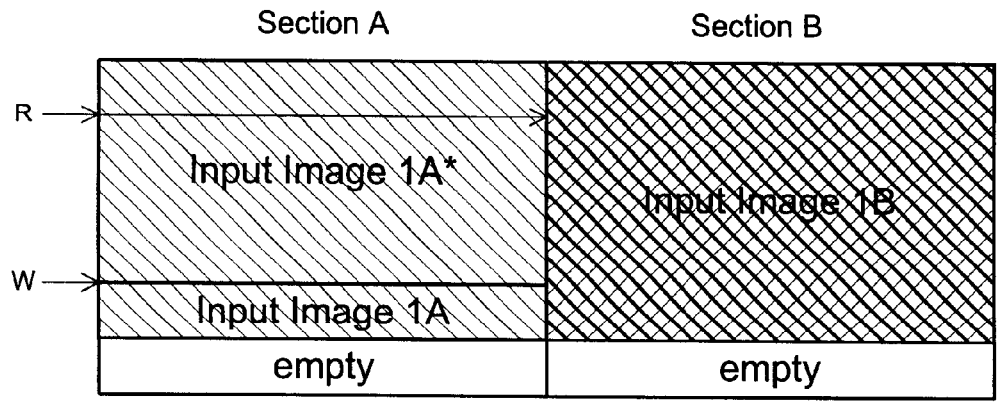
FIG. 7G shows the contents of the memory array at a time interval T7 as identified in FIG. 6, according to the second mode of operation of the preferred embodiment.

At some time after time T6, the Read Address Generator 42 is reset to the initial address and the stored data (Input Images 1A* and 1B) is read out of the memory array 43. In a similar manner as described for time T3, a read operation from the initial address fetches the first lines of both Input Images 1A* and 1B. Subsequent read operations fetch the remaining data. Write operations of Input Image 1A* data continue to addresses indicated by the Write Address Generator 41. This event is shown as time T7 in FIG. 6 with memory contents as shown in FIG. 7G.

Figure 7H:
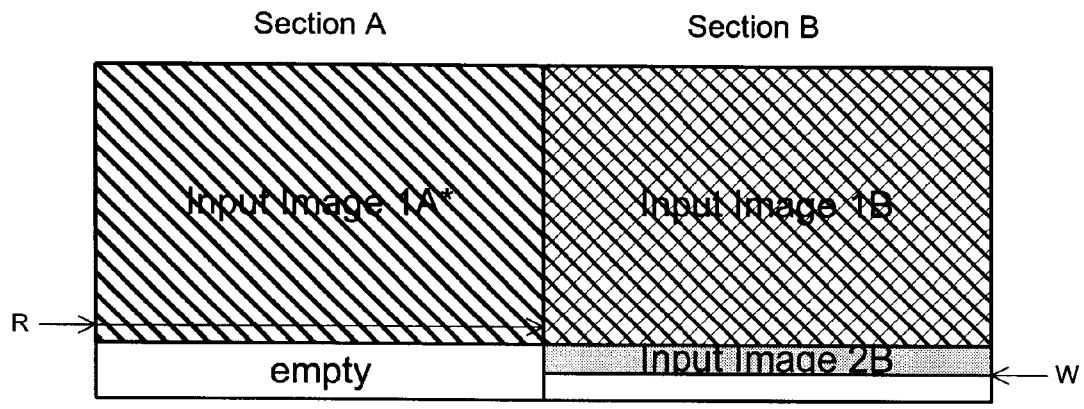
FIG. 7H shows the contents of the memory array at a time interval T8 as identified in FIG. 6, according to the second mode of operation of the preferred embodiment.

At some time after time T7, Input Image 2B is input. This data is not used in data processing at this time but must be stored in the memory array 43. Also, because there is no corresponding data for Input Image 2B to process, the downstream processor must use data from Input Images 1A* and 1B again. For this reason, data for Input Image 2B is stored at an unused area of section B of the memory array 43. The Write Address Generator 41 does not reset but holds its final value and writing begins at this location. The Write Mask Generator 44 controls the array so that no writing of data is done to memory array section A. This permits future reading of Images 1A* and 1B. Reading of Input Images 1A* and 1B from the memory array 43 is then completed. This event is shown as time T8 in FIG. 6 with memory contents as shown in FIG. 7H.

Figure 7I:
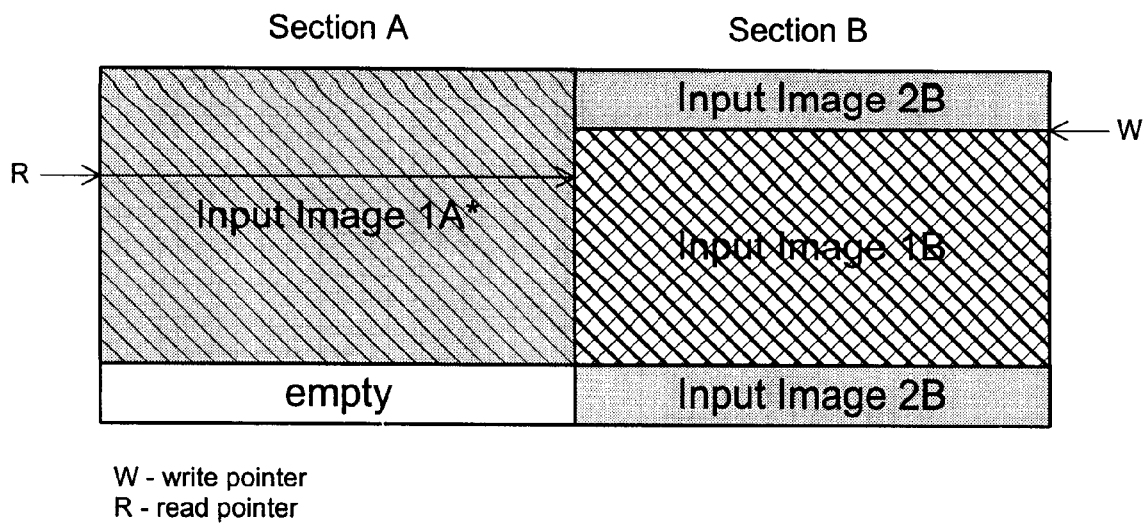
FIG. 7I shows the contents of the memory array at a time interval T9 as identified in FIG. 6, according to the second mode of operation of the preferred embodiment.

Reading of image data is then started again. Since there is no corresponding image to Input Image 2B, it is not possible to use this data in downstream processing by processor 47 at this time. Instead, reading of Input Images 1A* and 1B is repeated by resetting the Read Address Generator 42 to the location of the start of Input Images 1A* and 1B. As writing of Input Image 2B continues, the Write Address Generator 41 wraps around to zero and begins overwriting the data of Input Image 1B, but not before it has been read out. This event is shown as time T9 in FIG. 6 with memory contents as shown in FIG. 7I.

Figure 7J:
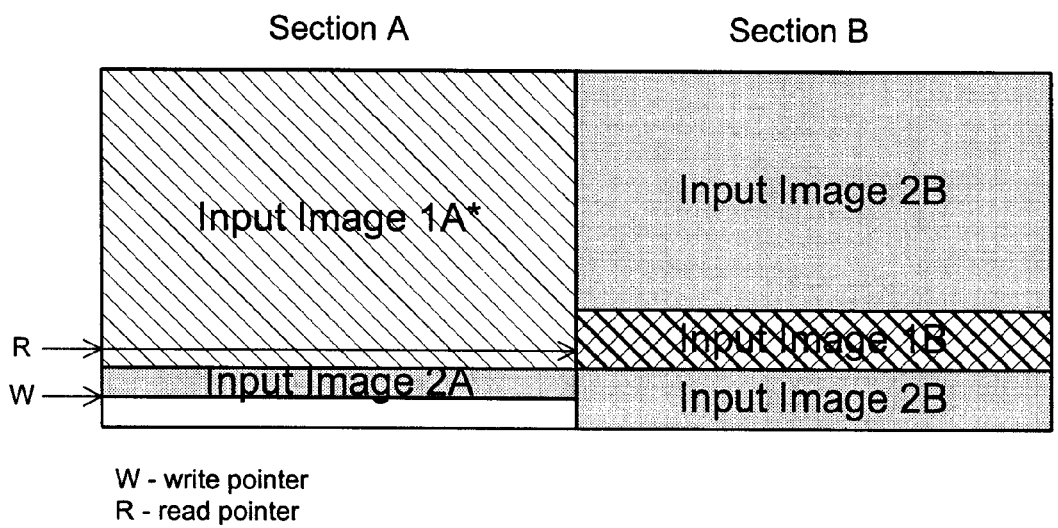
FIG. 7J shows the contents of the memory array at a time interval T10 as identified in FIG. 6, according to the second mode of operation of the preferred embodiment.

Following completion of Input Image 2B and a blanking period, Input Image 2A begins. Since this image will be processed together with Input Image 2B, it must be stored at the same address in section A of the memory array 43. The Write Mask Generator 44 controls the array so that no writing of data is done to memory array section B. At the start of Input Image 2A, the Write Address Generator 41 is programmed to the same location as was used to start Input Image 2B. During this time, reading of Input Images 1A* and 1B continues. This event is shown as time T10 in FIG. 6 with memory contents as shown in FIG. 7J.

Figure 7K:
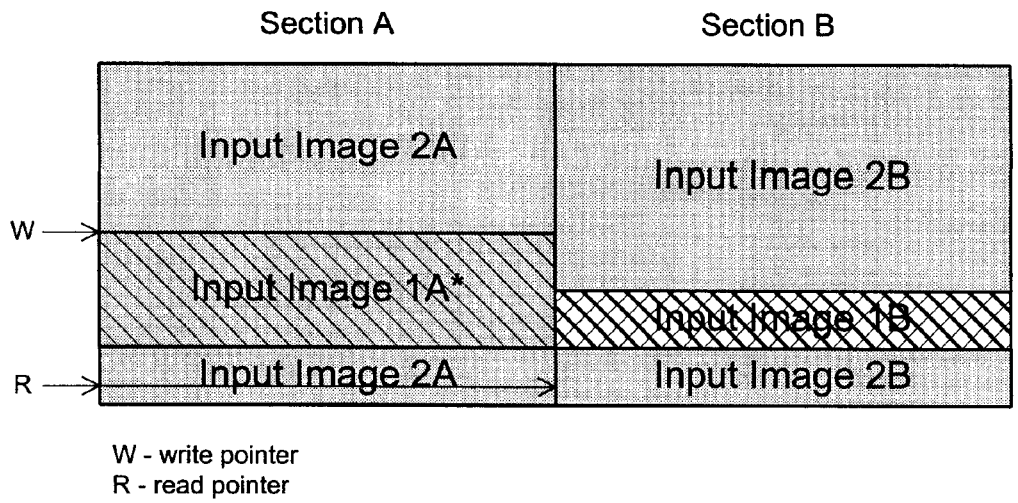
FIG. 7K shows the contents of the memory array at a time interval T11 as identified in FIG. 6, according to the second mode of operation of the preferred embodiment.

At some time after time T10, reading of Input Images 1A* and 1B has completed. The Read Address Generator 42 is then reset to the start of Input Images 2A and 2B so that these images can be read out and processed by processor 47. During this time, Input Image 2A is written into section A of the memory array 43. The Write Address Generator 41 has rolled over to zero and writing of Input Image 2A continues at the top of memory array section A, as controlled by the Write Mask Generator 44. This event is shown as time T11 in FIG. 6 with memory contents as shown in FIG. 7K.

Figure 7L:
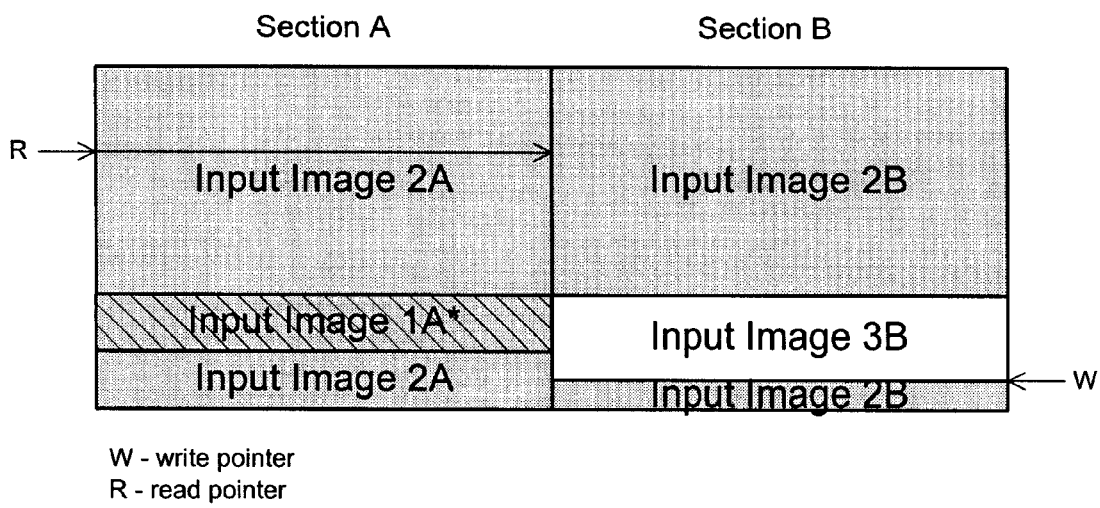
FIG. 7L shows the contents of the memory array at a time interval T12 as identified in FIG. 6, according to the second mode of operation of the preferred embodiment.

One image time later after time T11, Input Image 3B is supplied to the memory array 43. The Write Mask Generator controls the array so that no writing of data is done to section B. Since there is no corresponding image to Input Image 3B, it is not possible to use this data in downstream processing by processor 47 at this time. Instead, reading of Input Images 2A and 2B is repeated by setting the Read Address Generator 42 to the location of the start of Input Images 2A and 2B, and reading commences from that point. As writing of Input Image 3B continues, the Write Address Generator 41 wraps around to zero and begins overwriting data of Input Image 2B, but not before it has been read out. This event is shown as time T12 in FIG. 6 with memory contents as shown in FIG. 7L.

The cycle continues with each subsequent incoming image being stored alternately in memory section A or B by controlling the Write Mask Generator 44 and Write Address Generator 41. Read operations retrieve the stored data from both sections of memory array 43 from a location indicated by Read Address Generator 42.

Figure 8A:
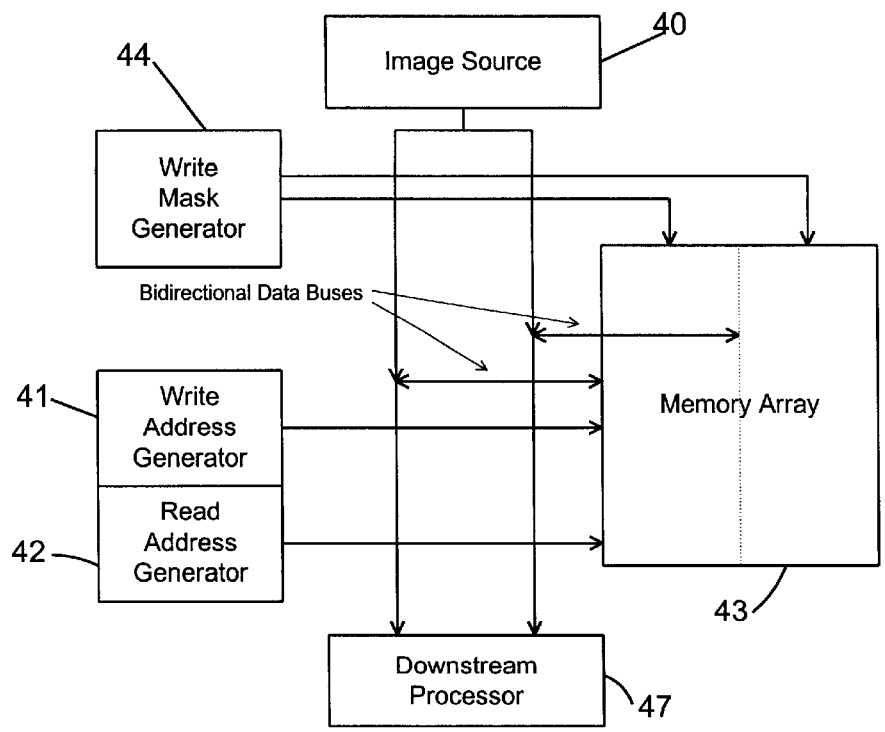

With reference to FIG. 8A, an alternative embodiment of the invention is shown wherein bidirectional data buses are used for writing data to the array 43 and reading data therefrom, in contrast with the dedicated unidirectional buses used in the implementation of FIG. 2.

Figure 8B:
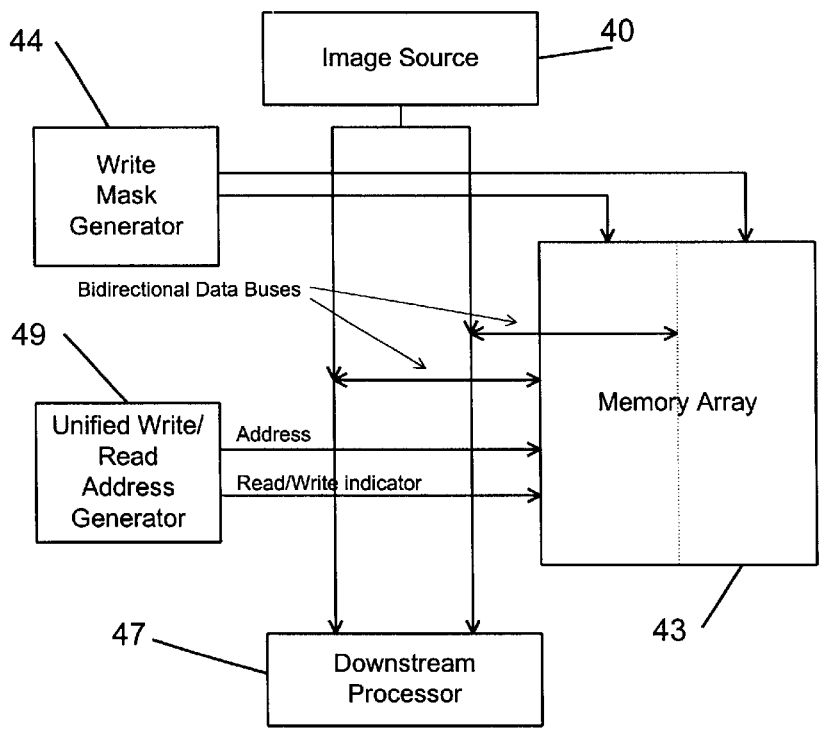
FIG. 8B is a block diagram showing a further alternative embodiment of the present invention where the memory array utilizes a single unified address input to indicate both reading and writing locations.

In FIG. 8B, a unified write/read address generator 49 is used to generate both read and write memory locations and a read/write indicator for indicating whether the generated address refers to a write location or a read location.

In all other respects the embodiments of FIGS. 8A and 8B operate similarly to the embodiment of FIG. 2.

While the method and apparatus of the present invention have been summarized and explained by an illustrative application, it will be readily apparent to those skilled in the art that many widely varying embodiments are within the scope of the present invention, and that the examples presented herein are by way of illustration only and should not be construed as limiting the scope of this invention.

I claim:

1. A method of storing and retrieving successive fields of digital image data to and from a memory array having a plurality of addressable memory locations, each of said memory locations; being partitioned into a plurality of sections which are accessible by a single address, comprising:

alternately storing said digital Image data representing said successive fields in respective ones of said plurality of sections of said memory array for the single address while inhibiting storage of said digital image data in each other one of said plurality of sections; and concurrently retrieving previously stored digital image data representing prior successive fields simultaneously from at least two of said sections of said memory array for the single address.

2. The method of claim 1, wherein each said step of alternately storing said digital image data representing said successive fields in respective ones of said plurality of sections of said memory array while inhibiting storage of said digital image data in each other one of said plurality of sections further comprises:

a) actuating a write pointer to generate successive write addresses to said memory array indicating locations where said digital image data is to be stored in one of said plurality of sections;

b) generating at least one control signal for inhibiting writing to each said other one of said plurality of sections of said memory array, so that said previously stored digital image data within each said other one of said plurality of sections of said memory array is not overwritten;

c) successively writing said digital image data into said successive write addresses in accordance with steps a) and b); and d) resetting said write pointer to a predetermined initial one of said write addresses.

3. The method of claim 2 wherein said at least one control signal comprises at least one write mask.

4. The method of claim 2, wherein said control signal comprises at least one array enable signal.

5. The method of claim 2, further comprising the step of actuating said write pointer to generate further successive write addresses without prior resetting of said write pointer in the event that said previously stored image data in either said one or said other one of said sections of said memory array is not to be overwritten, such that both said digital image data and said previously stored digital image data are retained in said memory array.

6. The method of claim 1, wherein each said step of concurrently retrieving previously stored digital image data representing prior successive fields simultaneously from said at least two sections of said memory array further comprises the steps of:

a) actuating a read pointer to generate successive read addresses to said memory array indicating locations where said previously stored digital image data is to be retrieved simultaneously from said at least two sections of said memory array;

b) successively reading said previously stored digital image data from said successive read addresses in accordance with step a); and c) setting said read pointer to a predetermined one of said read addresses where further previously stored digital image data is to be retrieved.

7. The method of claim 1, further comprising the step of further retrieving said previously stored digital image data during periods of time when data is not being stored in said memory array for purposes of additional image data analysis.

8. A method of storing and retrieving successive fields of digital image data to and from a memory array having a plurality of addressable memory locations, each of said memory locations being partitioned into a plurality of sections, comprising:

alternately storing non-identical and non-similar ones of said digital image data representing non-identical and non-similar ones of said successive fields in respective ones of said plurality of sections of said memory array for each address while inhibiting storage of said non-identical and non-similar ones of said input image data in each other one of said plurality of sections of said memory and inhibiting storage of similar and identical ones of said digital image data representing similar and identical ones of said successive fields; and concurrently retrieving previously stored digital image data representing prior successive fields simultaneously from at least two of said sections of said memory array corresponding to a single address.

9. Apparatus for storing and retrieving digital image data, comprising:

a) memory array means having a plurality of addressable memory locations, each of said memory locations being partitioned into at least two sections which are accessible by a single address;

b) write address generator means for generating successive write pointers for storing new input image data in successive ones of said addressable memory locations in a predetermined one of said at least two sections of said memory array means;

c) write mask generator means for generating a write mask which inhibits writing to sections of said addressable memory locations other than said predetermined one of said at least two sections, so that stored data from other images at said addressable memory locations is not overwritten; and d) read address generator means for generating successive read pointers concurrently with the storage of said new input image data into said memory means array for retrieving said data from at least two of the sections of the memory array.

10. The apparatus of claim 9, wherein said memory array means comprises multiple discrete memory arrays and said write mask generator means comprises circuitry for generating said write mask in the form of array enable signals for selectively enabling said multiple discrete memory arrays.

11. The apparatus of claim 9, wherein said write mask generator is integrated within said memory array means.

12. The apparatus of claim 9, further comprising a single bidirectional data bus for both said storing and said retrieving of said data to and from said memory array means.

13. The apparatus of claim 9, wherein said write address generator means and said read address generator means are incorporated in a single unified address generator for generating address signals and wherein said memory array means further includes a single unified address input for receiving said address signals from said unified address generator and an additional input for receiving a signal from said unified address generator indicative of whether individual ones of said addresses correspond to write locations or read locations.

14. Apparatus for storing and retrieving digital image data, comprising:

a memory array having a plurality of addressable memory locations, each of said memory locations being partitioned into at least two sections which are not accessible by a single address;

a write address generator, coupled to said memory array, to generate successive write pointers to locations for storage of new input image data in successive ones of said addressable memory locations;

a write mask generator to generate a write mask inhibiting writing to any section of said memory array accessible by said single address other than a selected section of said memory array to prevent overwriting of previously stored data in any section accessible by said single address other than the selected section of said memory array; and a read pointer generator to generate successive read pointers concurrently with the storage of the new input image data into said memory array for retrieval of the stored data therefrom concurrently therewith.

15. A machine accessible medium storing a process for storing and retrieving successive fields of digital image data to and from a memory array having a plurality of addressable memory locations, each of said memory locations being partitioned into a plurality of sections accessible by a single address, comprising:

alternately storing the digital image data representing the successive fields in respective ones of the plurality of sections of the memory array for the single address, while inhibiting storage of the digital image data in each other one of the plurality of sections; and concurrently retrieving from at least two of the sections of the memory array for the single address, previously stored digital image data representing prior successive fields, simultaneously with said storing.

* * * * *

UNITED STATES PATENT AND TRADEMARK OFFICE
CERTIFICATE OF CORRECTION

PATENT NO.    : 6,300,964 B1
DATED         : October 9, 2001
INVENTOR(S)   : Bruce Intihar It is certified that error appears in the above-identified patent and that said Letters Patent is hereby corrected as shown below:

<u>Title page,</u>
Item [73], Assignee: change "Genesis Microship, Inc." to -- Genesis Microchip, Inc. --.

Signed and Sealed this

Eleventh Day of June, 2002

*Attest:*

JAMES E. ROGAN
*Attesting Officer*     *Director of the United States Patent and Trademark Office*